Figure 1:
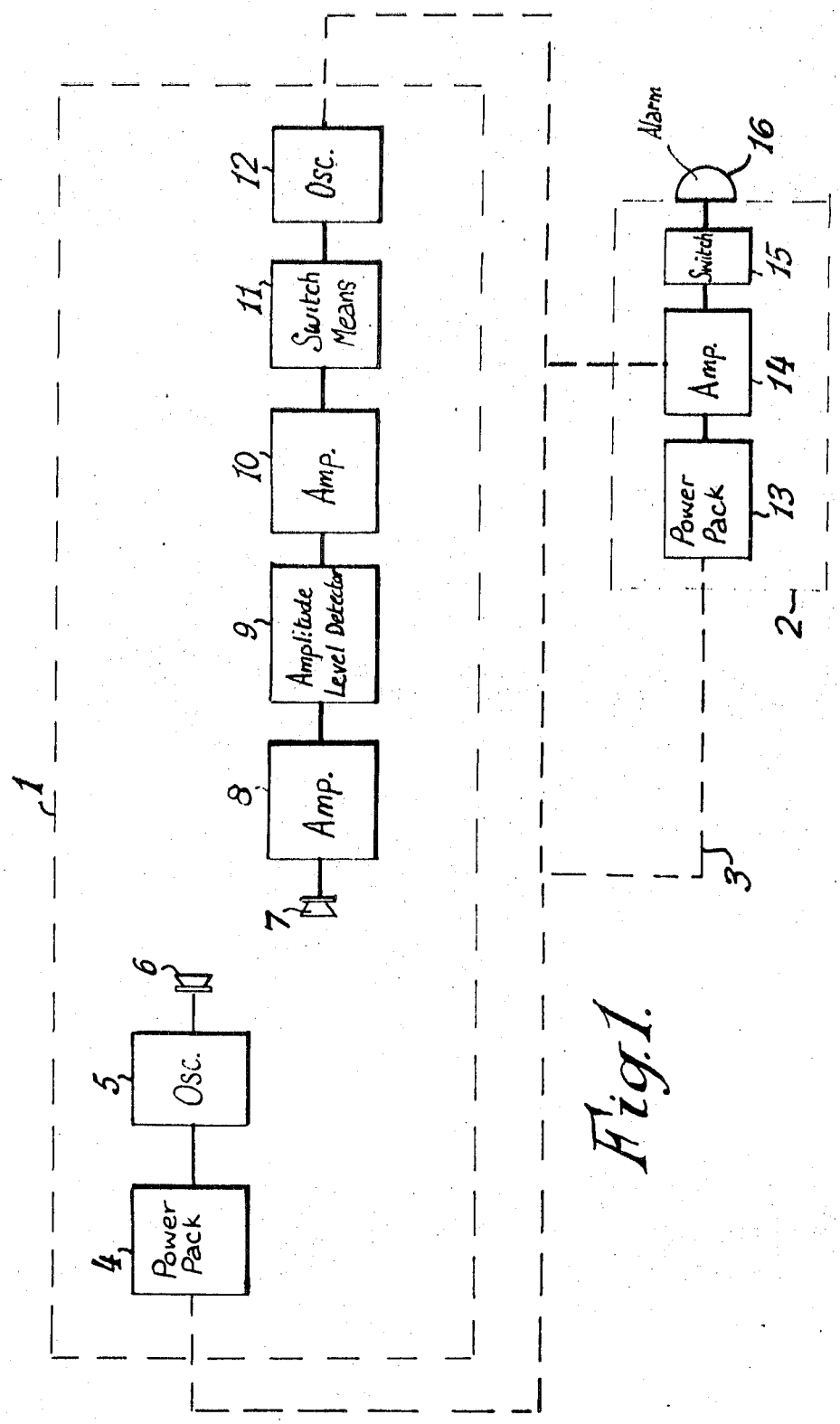

United States Patent
Everitt

[15] 3,659,289
[45] Apr. 25, 1972

[54] ALARM DEVICE

[72] Inventor: Kenneth John Everitt, London, England

[73] Assignee: Donald Patrick White, Loughton, Essex, England a part interest

[22] Filed: Sept. 23, 1969

[21] Appl. No.: 860,240

[30] Foreign Application Priority Data

Sept. 26, 1968 Great Britain......................45,782/68

[52] U.S. Cl...............................340/416, 325/474, 340/216, 340/258 B, 340/276
[51] Int. Cl. ......................................................G08b 13/16
[58] Field of Search...........340/276, 310, 258, 258 A, 258 B, 340/216, 416; 325/474

[56] References Cited

UNITED STATES PATENTS

| | | | |
|---|---|---|---|
| 3,135,951 | 6/1964 | Byrne | 340/276 |
| 3,287,722 | 11/1966 | Craig | 340/310 |
| 3,513,463 | 5/1970 | Stevenson, Jr. et al. | 340/258 |
| 3,388,389 | 1/1968 | Henriques | 340/310 |
| 2,071,933 | 2/1937 | Miessner | 340/258 |
| 3,191,124 | 6/1965 | Brown | 325/474 |
| 2,400,309 | 5/1946 | Kock | 340/258 |
| 3,378,829 | 4/1968 | Alati et al. | 340/416 |
| 2,655,645 | 10/1953 | Bagno | 340/258 |

*Primary Examiner*—David L. Trafton
*Attorney*—Curtis, Morris & Safford

[57] ABSTRACT

This invention relates to a monitoring device comprising a generator for generating longitudinal compressive waves of ultrasonic frequency and a receiver unit for monitoring the amplitude of the waves at the ultrasonic frequency received by a receiver. The receiver unit includes an oscillator for generating a signal train at a given carrier frequency and first switch means for controlling the transmission of the signal train at that carrier frequency to a remote detector unit, said first switch means being actuated in response to a change in the amplitude of the signal received by the receiver. The detector unit is tuned to the carrier frequency and has a further switch means under the control of the signal train (preferably transmitted via the power lines wiring) for actuating an alarm and/or recording device to indicate when the amplitude of waves received by the receiver has changed.

8 Claims, 3 Drawing Figures

ALARM DEVICE

This invention relates to a monitoring device for detecting movement of an object and in particular, but not exclusively, to a device for detecting the presence of an intruder in an enclosure.

Enclosure monitoring devices (e.g. burglar alarms) are known in which ultrasonic waves are employed in the enclosure and the device senses changes in the frequency of reflected waves to indicate the presence of a moving object in the enclosure (the well known Doppler effect will cause an increase or decrease in the frequency of the wave reflected off a moving object depending on whether that object is moving towards the source or away from the source). Such prior art devices require to be highly stabilised if they are to give a reliable indication of the entry of an intruder into the enclosure and further must be highly sensitive as to frequency changes if they are to respond to slow moving objects, but not to respond to drift which may occur in the output frequency of the wave generator.

A device in accordance with the present invention relies on detecting changes in the amplitude of reflected waves and can thus be designed without regard to close coupling between the generator and the receiver.

In many cases it is desirable that the vicinity where an alarm is raised, in the event of undesirable entry into the enclosure, is remote from the enclosure being protected. For example, it may be desirable for the alarm to be raised in a night-watchman's room at a factory or warehouse which may be many metres (even several hundred metres) away from the protected enclosure. With prior art devices it is necessary to couple a part of the device in the protected enclosure with a further part in the vicinity where the alarm is to be raised by means of specially laid wires and this increases the cost of the installation of the device and the susceptability of the device to failure and/or tampering by would-be intruders.

One important feature of the present invention is that the construction of the device enables the wiring of conventional power lines to be used as the link between the two parts of the device.

A further important feature of the present invention is that it can be used in unenclosed areas (e.g. open-air storage dumps or aerodromes) and can detect the presence of an intruder in the area many metres from the device by monitoring the appearance of reflected waves from the intruder.

According to the invention a monitoring device comprises a generator for generating longitudinal compressive waves of ultrasonic frequency, a receiver unit for monitoring the amplitude of the waves at the ultrasonic frequency received by a receiver, an oscillator for generating a signal train at a given carrier frequency, first switch means for controlling the transmission of the signal train at that carrier frequency to a detector unit, said first switch means being actuated in response to a change in the amplitude of the signal received by the receiver, the detector unit being tuned to the carrier frequency and having a further switch means under the control of the signal train for actuating an alarm and/or recording device to indicate when the amplitude of waves received by the receiver has changed.

In a preferred embodiment of device in accordance with the invention the signal train is at a frequency of many kilocycles and is transmitted to the detector unit via the power lines. Conveniently the generator and the receiver are housed in one cabinet deriving its power supply from a power line outlet and feeding the signal train to that power line outlet and the detector unit (which may or may not include the alarm and/or recording device) is connected to a power line outlet at a position remote from the generator/receiver unit.

The generator and receiver may be a matched pair of piezoelectric devices and conveniently operate at a frequency greater than 22 kilocycles and preferably greater than 30 kilocycles. 40 kilocycles has been found to be a suitable operating frequency.

Since the detector is sensitive to changes in the signal train passed to it (e.g. via the power lines) from the generator/receiver unit it may respond to a change in frequency of the signal train, the appearance of the signal train or the disappearance of the signal train. Thus, for example the oscillator may be working all the time but its output is only switched to the detector (or its output is only switched off from the detector) when there is a change in the wave pattern received by the receiver. Alternatively, the oscillator can be made to oscillate (or put out of oscillation - or made to oscillate at a different frequency to which the detector is insensitive) when there is a change in the wave pattern received by the receiver.

Where a plurality of generator/receiver units are to be employed in a plurality of different locations (e.g. around the perimeter of an open space or in a plurality of different enclosures) and the presence of an intruder in the vicinity of any generator/receiver is required to be indicated in a single detector unit, all the generator/receiver units may employ generators operating at the same frequency but with the signal train from each generator/receiver unit being modulated at a different frequency. The single detector unit can then be provided with an input channel for each generator/receiver unit each channel being responsive to a different one of the modulated signal trains.

Conveniently, to minimize spurious actuation of the device, actuation of the first switch means only occurs following a change in amplitude of the signal received by the receiver which is greater than a preset minimum or occurs for a time period greater than a preset minimum time.

One embodiment of enclosure protection device in accordance with the invention will now be described, by way of example with reference to the accompanying schematic drawings.

FIG. 1 shows a burglar alarm which comprises a generator/receiver unit shown within the dotted line 1 and a detector unit shown within the dotted line 2, the generator/receiver unit 1 being located within an enclosure in which the presence of intruders is to be detected and the detector unit 2 being located at any position remote from the enclosure, the connection between the two units being via the power supply (shown as the dotted link 3).

The generator/receiver unit comprises a highly stabilized power pack 4, feeding an oscillator 5 which in turn is supplying HF power to a sonic emitter 6.

The power pack 4 conveniently comprises a full-wave rectifier with an associated smoothing circuit and a transistor-Zener diode bridging path to maintain a stabilised DC output irrespective of wide fluctuations of AC input. The oscillator 5 is conveniently transistorised and operates at approximately 40,000 cycles per second. The sonic emitter 6 is conveniently a piezoelectric crystal. The combination of integers 4, 5 and 6 gives rise to the emission of longitudinal compression waves from the emitter 6 at ultrasonic frequencies, the waves generating a standing wave pattern in the enclosure in which the unit 1 is placed.

A further piezoelectric crystal is employed as a receiver 7 and this is placed close to the emitter 6 to monitor reflected waves reaching it from reflecting surfaces in the enclosure. An amplifier 8 (tuned to the frequency of the ultrasonic waves) amplifies the output of the receiver 7 and feeds it to an amplitude level detector 9. In a preferred embodiment, the integer 9 comprises an envelope detector which senses changes in the output of the amplifier 8. The envelope detector may simply be a capacitor connected to receive the half-wave rectified output of the amplifier 8, any change in the charge stored by the capacitor signifying a change in the amplitude of the waves reaching the receiver 7. The amplifier 10 serves as an envelope amplifier and amplifies the output signal of the amplitude level detector 9 so that it is sufficient to actuate any convenient switch means 11 and thus control the operation of a signal oscillator 12. In one embodiment, the oscillator 12 is working continuously and the switch means, e.g. a transistor or a solenoid reed switch) on actuation merely serves to feed the oscillator output into the power 3 or to disconnect the oscillator from the power 3. Alternatively, the switch means 11 may be employed to turn the oscillator on or off, the oscillator output being connected to the power lines 3 throughout. If the arrangement is such that, under conditions of a uniform amplitude of reflected waves (i.e. a stationary standing wave pattern), the oscillator is connected to the power lines 3, there is the advantage that any disconnection of the generator/receiver unit 1 is instantly detected and thus makes the device less susceptible to being rendered inoperative by an intruder.

The frequency of the oscillator can be chosen to be any convenient value bearing in mind that it is required to generate a signal train for transmission through the power system. One convenient frequency for this purpose has been found to be 120 kilocycles. Frequencies in the range 100 to 260 kilocycles can also be employed.

The detector unit 2 has its own power supply 13, an amplifier 14 tuned to the frequency of the oscillator 12 a switch means 15 and any convenient alarm or count recorder 16. The amplifier 14 actuates the switch means 15 when the signal train from the oscillator 12 either appears on the power lines 3 or disappears from the power lines 3 depending on the mode of operation selected. In either case, the alarm or count recorder 16 is actuated.

The emitter 6 and the receiver 7 may be located side by side in the same cabinet and it is then merely necessary to place that cabinet in the enclosure and to connect the generator/receiver unit to the power lines. The detector unit is then plugged into the power lines at some other point (and in practice it has been found possible for the receiver to be several hundred metres away from the detector) to obtain an indication whenever the standing wave pattern in the enclosure is disturbed. Alternatively, the emitter 6 and the receiver 7 may be spatially separated in which case the standing wave pattern between them is monitored and in this way a larger enclosure can be protected. The arrangement in which the oscillator 12 is normally quiescent and only oscillates when there is a change in the standing wave pattern has the advantage that a plurality of generator/receiver units, each with its own oscillator 12 tuned to the same frequency, can be coupled to a single detector unit to monitor a plurality of separated enclosures, a disturbance of the standing wave pattern in any of the enclosures being detected on the detector unit. With this modified arrangement, however, the circuit in the detector unit has to be adapted to distinguish between a signal derived from an oscillator 12 and a spurious oscillation on the power lines at the frequency of the oscillator but not associated with any of the oscillators. One way of achieving this distinction is to provide the detector unit 2 with two amplifiers 14 one tuned to accept signals at the oscillator frequency and the other filtered to accept any frequency except the oscillator frequency and to arrange for the switch 15 to be actuated only when a signal is passed to it from the one amplifier but not from the other amplifier.

An alternative method of distinguishing between a "true" signal transmitted from an oscillator at the predetermined frequency and "noise" (which will be of broad-band character) is to employ two tuned amplifiers connected in parallel, one tuned to the predetermined frequency of the oscillator and the other tuned to a different frequency suitably spaced from the predetermined frequency. (For example, if the oscillators are tuned to transmit signal trains at 120 kilocycles one amplifier in the detector unit would be tuned to 120 kilocycles and the other tuned to (say) 390 kilocycles). The outputs from the two tuned amplifiers are led to a discriminating switch unit which actuates the alarm only on the appearance of an output from the one amplifier and not on the appearance of outputs from both amplifiers or the appearance of a signal just from the other amplifier.

Although the primary purpose of the device is to protect an enclosure against intruders it will be appreciated that since the device is actuated whenever there is a change in the wave pattern as monitored by the receiver 7, the device can be used for other applications, for example for counting the number of people passing into a building (in this case each disturbance of the standing wave pattern caused by a person passing into the building is used to actuate a count recorder rather than an alarm) or on the occasion of a fire in the enclosure which will give rise to energetic air currents sufficient to change the amplitude of waves received by the receiver 7.

Figure 2:
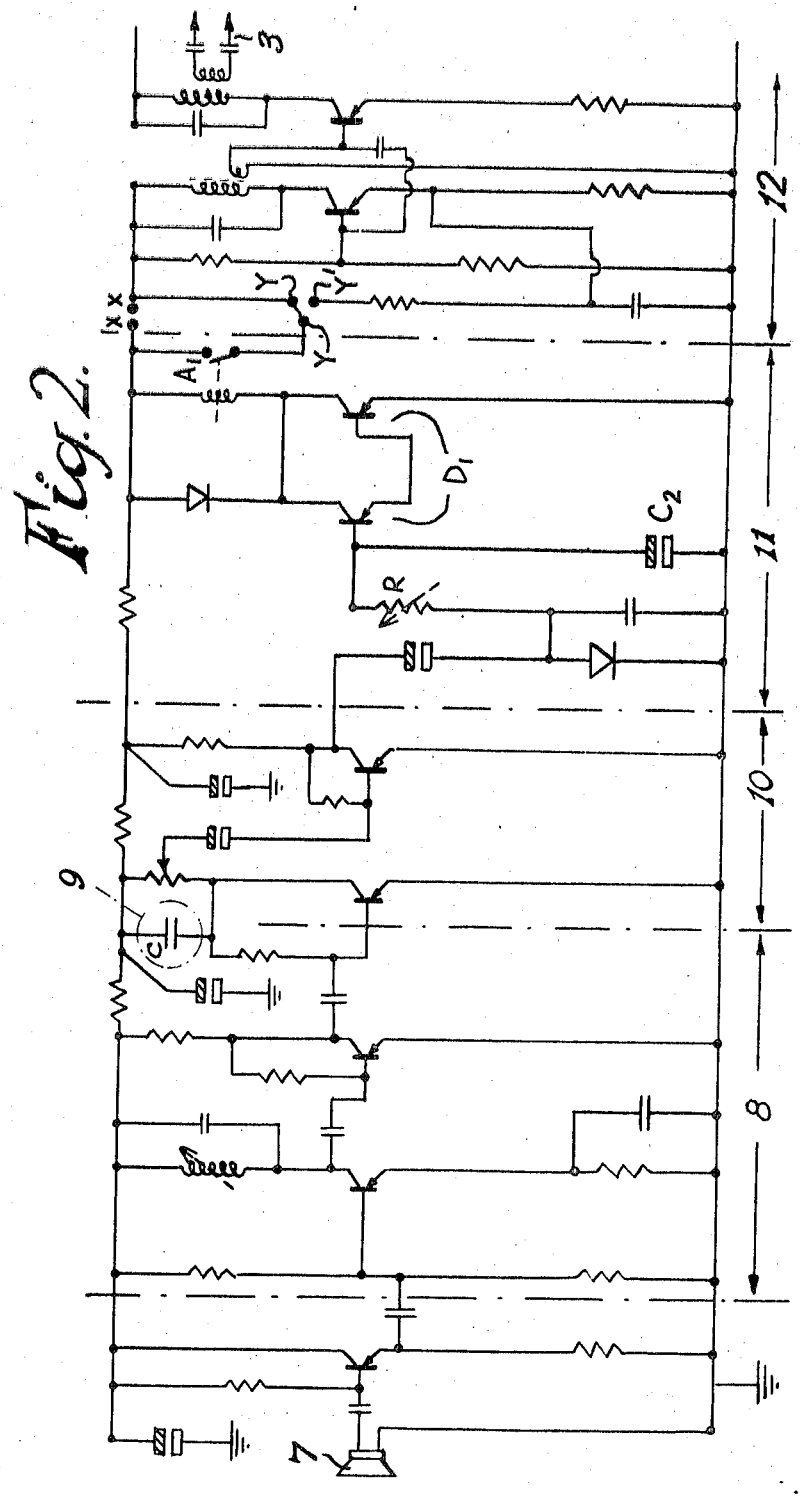
Figure 3:
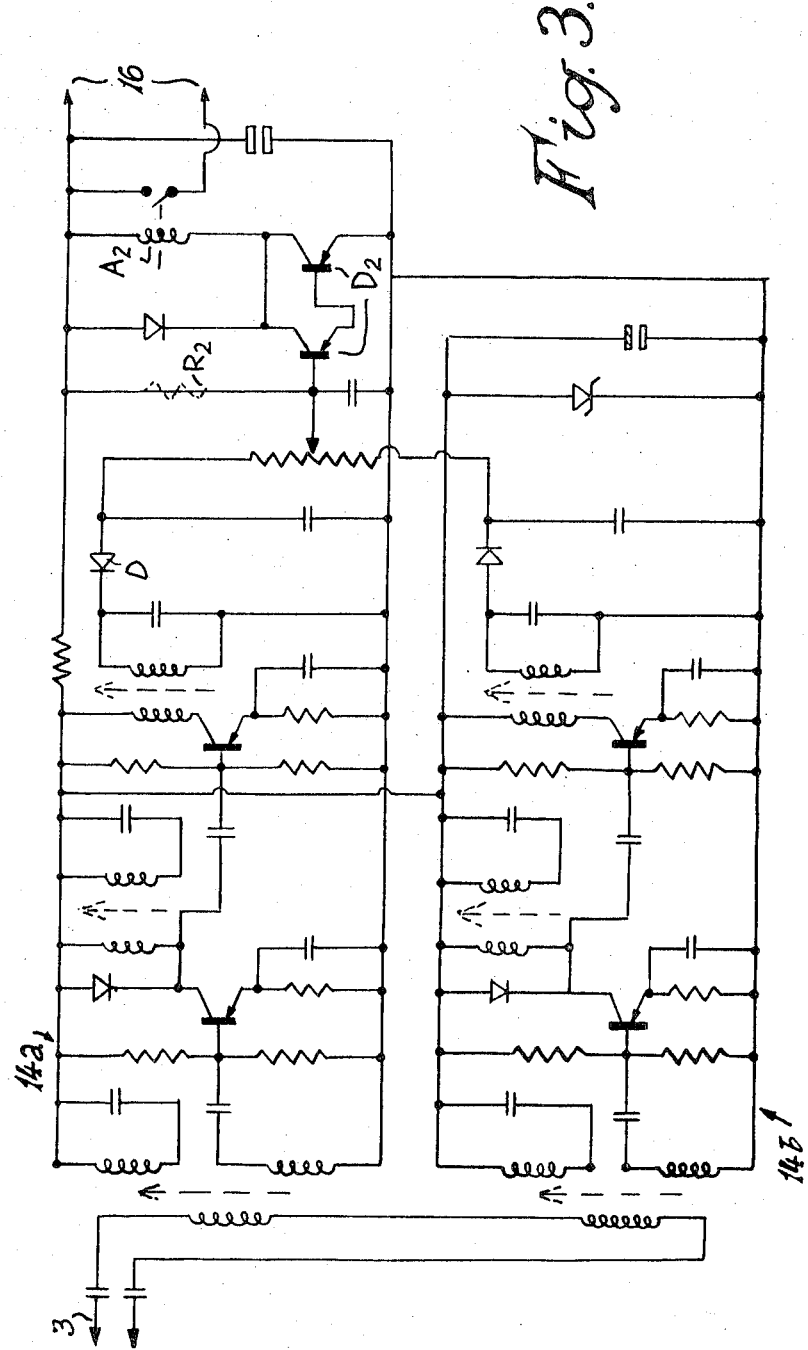

FIGS. 2 and 3 of the drawings show typical circuits for a device in accordance with the invention.

FIG. 2 shows the circuits for integers 7 to 12 of FIG. 1 (integers 4 to 6 are wholly conventional and need not be further described) and FIG. 3 shows a typical detector unit 2 having two tuned amplifiers 14a and 14b for discriminating between a genuine signal and noise on the power lines.

Referring to FIG. 2 the output from the receiver 7 is fed to a two-stage tuned amplifier (amplifier 8) via an emitter-follower circuit. A capacitor C, serves as the amplitude level detector 9 which is followed by a two-stage "envelope" amplifier 10. The output from this amplifier is led to a Darlington pair $D_1$ via a leakage path (a resistor R and a capacitor $C_2$) whose impedance is adjustable to control the sensitivity of the device so that alarm only arises following a signal from the amplifier 10 which is greater than a preset minimum signal and occurs for a time longer than a preset minimum time.

A relay $A_1$ forms the final stage of the switch means 11 and actuates an oscillator 12 connected to the link 3 in either of two ways. The connections shown in FIG. 2, are for "positive signalling" in which case the oscillator 12 only oscillates when the relay $A_1$ closes (thus transmitting the signal train only when alarm conditions occur). If however, the contact $YY^1$ is made (rather than the contact YY as shown) and the contact XX is also made the arrangement for "negative signalling" is obtained and the oscillator will normally oscillate but will become quiescent on the closing of the relay $A_1$.

The upper amplifier (14a) in FIG. 3 is tuned to the frequency of the oscillator 12 while the lower amplifier (14b) is tuned to a different frequency in the "noise" band. If the "positive signalling" mode is employed both amplifiers will be required the circuit being arranged so that the Darlington pair $D_2$ only energises a relay $A_2$ if a signal is received from the amplifier 14a without a signal from the amplifier 14b. If the "negative signalling" mode is employed, the amplifier 14b is not required but the diode D is reversed and a resistor $R_2$ (shown dotted) is employed in the position shown.

If the amplifier 14b is omitted it is desirable to retain the Zener diode and parallel connected capacitor (shown on the right of amplifier 14b) in the circuit of amplifier 14a, since these components have a smoothing and stabilising effect on the H.T. lines of both amplifiers.

The power pack 13 has not been shown in FIG. 3 since this can be of any conventional design.

I claim:
1. A monitoring device comprising
   a generator,
   a receiver and
   a detector unit,
   the generator having
      an emitter for generating longitudinal compressive waves of ultrasonic frequency
   the receiver having
      means for receiving longitudinal compressive waves at said frequency, means for monitoring the amplitude of the waves received by said receiving means, an oscillator for generating a signal train at a given carrier frequency, a power line connection cord and first switch means for controlling the transmission of the signal train at said carrier frequency to the power line connection cord in response to a change in the amplitude of the signal received by said receiving means
   the detector unit having
      a further power line connection cord, an amplifier tuned to said carrier frequency, a further switch means controlled by the amplifier and indicating means controlled by the further switch means whereby the indicating means is under control of the signal train and indicates when the amplitude of waves received by said receiving means in the receiver has changed; said detector unit further including a second tuned amplifier only one of the two amplifiers being tuned to receive the signal train, said further switch means including discriminating means which actuates the indicating means only when an output is received solely from said one amplifier tuned to receive the signal train.

2. A monitoring device as claimed in claim 1, in which the generator and the receiver are proximately housed having a single power line connection cord which serves both to supply electric power to the generator and receiver from a power line and for impressing the output of the oscillator on the power line, said further connection cord of the detector unit serving to supply electric power to the detector unit and to transmit the signal train impressed on the power line to said tuned amplifier.

3. A monitoring device as claimed in claim 1, in which said first switch means in said receiver stops the transmission of a signal train to the detector unit when the amplitude of the waves received by said receiving means changes by more than a predetermined amount in less than a predetermined time.

4. A monitoring device as claimed in claim 2, in which said first switch means in said receiver stops the output of said oscillator from reaching said connection cords when the amplitude of the waves received by said receiving means changes by more than a predetermined amount in less than a predetermined time.

5. A monitoring device as claimed in claim 1, in which the oscillator in said receiver only impresses a signal train on said power line connection cords when the amplitude of the waves received by said receiving means changes by more than a predetermined amount in less than a predetermined time.

6. A monitoring device as claimed in claim 2, in which the receiver oscillator only impresses a signal train on the power line connection cords when there is a change in the wave pattern received by said receiving means in said receiver.

7. A monitoring device as claimed in claim 1, in which said emitter generates waves at a frequency greater than 30 kiloHertz.

8. A monitoring device as claimed in claim 1, in which said emitter generates waves at a frequency greater than 30 kiloHertz.

* * * * *